REACTIVE INTERCOUPLING OF MODULAR UNITS

Filed March 26, 1958 4 Sheets-Sheet 1

INVENTORS:
Leon H. Steinman
Merritt L. MacKnight
By Seymour Scholnick
Attorney

REACTIVE INTERCOUPLING OF MODULAR UNITS

Filed March 26, 1958 4 Sheets-Sheet 2

INVENTORS:
Leon H. Steinman
Merritt L. MacKnight
By Seymour Schalnick
Attorney

Jan. 3, 1961 L. H. STEINMAN ET AL 2,967,267

REACTIVE INTERCOUPLING OF MODULAR UNITS

Filed March 26, 1958 4 Sheets-Sheet 3

INVENTORS:
Leon H. Steinman
Merritt L. MacKnight
By Seymour Scholnick
Attorney

INVENTORS:
Leon H. Steinman
Merritt L. MacKnight
By Seymour Scholnick
Attorney

United States Patent Office 2,967,267

Patented Jan. 3, 1961

2,967,267

REACTIVE INTERCOUPLING OF MODULAR UNITS

Leon Harold Steinman, Los Angeles, and Merritt L. MacKnight, Manhattan Beach, Calif., assignors, by mesne assignments, to Litton Systems, Inc., Beverly Hills, Calif., a corporation of Maryland Filed Mar. 26, 1958, Ser. No. 724,139

13 Claims. (Cl. 317—101)

The present invention relates to reactively intercoupled electrical units and more particularly to electrical apparatus comprising a plurality of stacked envelopes, each envelope containing a predetermined electrical unit which is reactively intercoupled to adjacent envelopes.

In the assembly of a complex electrical apparatus of the present day, such as a modern digital computer, an enormous amount of interconnection is necessary thereby presenting a problem in the production and repair of such apparatus which is difficult to overcome. For example, in conventional assembly of electrical apparatus all elements of the apparatus are either permanently attached to a chassis or are removably mounted on the chassis by means of plug-in mounts. Therefore, by necessity a great number of the element interconnections as well as the elements themselves must be located at or in proximity of the chassis. Since the space at or in proximity of the chassis is limited, the elements and interconnection locations become concentrated and difficult to reach thereby making assembly difficult. A quick glance at the chassis of any conventional electrical apparatus will quickly demonstrate this condition.

This condition not only makes the assembly of the apparatus difficult but makes the inspection for completeness extremely time consuming. Considering the problem of repair, if one of the removably mounted elements becomes defective it can be spotted and replaced relatively easily, since such removable elements can be readily replaced on a trial and error basis. However, if one of the elements permanently attached to the chassis or one of the interconnections becomes defective, finding the defect and correcting it requires the attention of a skilled technician for a considerable period of time.

In addition, the present trend toward smaller size machines further complicates the problems of assembly and repair and moreover makes it extremely difficult to design the physical layout of the apparatus with some semblance of neatness and in a manner to reduce stray inductance and capacitance between the elements and wiring of the apparatus. This is true since the elements and wiring of the apparatus by necessity must be interwoven and very close to each other in order to be contained in the limited space provided.

The design, assembly, and repair problems could be substantially lessened if each of the electrical units or subsections comprising the electrical apparatus could be enclosed in an envelope, such as a cube, for example, that could be stacked or placed in rows in some predetermined order. The layout of the apparatus could then be done for example at the same time as the circuit design is developed, by calling out a number X, Y, Z, *h* where X, Y, and Z, are the volume assignments in an X, Y, Z, coordinate system and *h* is the type of circuit to be employed. Thus for example, 3463 might designate the third envelope in the X direction, the fourth envelope in the Y direction, and the sixth envelope in the Z direction and the type of circuit represented by the final 3, for example, could be a flip flop.

The assembly of such a system would be simplified since only a predetermined number of elements would be included within an envelope thereby insuring enough space to easily interconnect the elements therein. It is clear that the repair of such a system would be much simplified since the envelopes could be removed and replaced with equal or greater ease than plug in elements removably affixed to the chassis of the conventional assembly.

It is clear, of course, that the electrical units in the envelopes must be interconnected to operate. The conventional prior art method of interconnection would involve the use of male plugs and corresponding female sockets. The plugs would be mounted on the surface of a number of envelopes and positioned on as many sides of the envelopes as necessary to completely interconnect the envelopes. The envelopes adjacent to the plugged envelopes would have corresponding female sockets mounted on their surfaces so that when the envelopes are placed contiguously the sockets and plugs will mate and interconnect the envelopes.

However, the socket and plug interconnection system, herein just discussed, suffers from several severe limitations. Firstly, after a relatively short period of use the sockets expand in size thereby leading to loose connections between envelopes. Secondly, the plug surfaces tend to corrode or become dirty thereby preventing a proper contact between the plugs and the corresponding sockets. Thirdly, if any of the plugs or sockets become bent or misaligned in any other way the envelopes cannot be properly aligned. Fourthly, since the plugs extend for a distance into the sockets and since more than one side of the envelope will be used as an interconnecting surface (so that plugs will be extending into or from several surfaces), there will be interference between the plugs such that one envelope cannot be removed from its contiguous position with the other envelopes without removing substantially all the envelopes from their positions also. Therefore, in order to reap the full benefit of the disclosed method of envelope assembly the prior art is in need of an intercoupling system that will provide reliable interconnections over a relatively long period of use and which will permit the replacement of any envelope without necessitating the disassembly of a substantial number of other envelopes.

The present invention provides a system for intercoupling a plurality of electrical units in a plurality of corresponding envelopes wherein reliable intercouplings are insured regardless of the length of the period of use of the envelopes and wherein any envelope can be easily removed from the envelope assembly without removing any other or only a few other envelopes in the assembly.

In accordance with the basic concept of the invention an electrical unit contained in an envelope is reactively coupled to other electrical units by means of electrical or magnetic induction. According to the invention, a plurality of envelopes containing a plurality of corresponding electrical units can be reactively intercoupled so that the electrical units will operate in a predetermined manner characteristic of a desired electrical apparatus without the envelope being physically interconnected. Therefore, any one of the envelopes can be readily removed or inserted.

In a first embodiment of the invention a three stage binary counter is assembled in accordance with the invention wherein three identical stages of the counter are contained in three corresponding identical cubical envelopes and the three cubical envelopes are inductively intercoupled to each other without any connections therebetween; an input signal, an output signal, and an A.C.

power signal also being inductively transmitted between the counter and external circuits.

Each of three cubical envelopes has an input coil wound on a corresponding cup core mounted on one side of the envelope, the exposed open face of the cup core being substantially parallel to and very nearly flush with the side of the envelope upon which it is mounted. In addition, each of the envelopes has an output and power coil wound on corresponding cup cores which are mounted on the sides of the envelopes in the same manner as the input coil. In each envelope the input, output, and power coils are connected to the input, output, and power terminals of a counter circuit contained herein.

In assembly the three envelopes are placed in a row with the output coil of a first envelope being placed adjacent to the input coil of a second envelope and the input coil of the remaining third envelope being placed adjacent the output coil of the second envelope. The envelopes are so positioned that the cup cores of adjacent input and output winding are in abutting relationship. Further, the three cubical envelopes are positioned so that the sides of the three envelopes having the power coils mounted therein are all facing in the same direction. A.C. power signals which energize the three counter circuits are inductively supplied to each of the circuits through the beforementioned power coils.

In operation input signals which are to be counted are applied by inductive coupling to the input of the counter circuit in the first envelope. In the same manner the output signal of the first counter circuit is inductively applied to the counter circuit in the second envelope and the output of this second counter circuit is similarly applied to the remaining counter. The output of this last counter is inductively radiated to a coil in an output envelope. A pair of wires connected to the ends of the output coil carry the output signal to wherever it is desired.

Since the counter envelopes are not physically interconnected any one of them can be replaced merely by picking it up and replacing it with another envelope containing a new counter. Therefore, the repair of a counter mechanized in this manner can be accomplished in a short period of time by a person of little skill, while a counter mechanized in accordance with the prior art methods requires a considerable period of time of a relatively skilled person to find the source of error and remedy it.

In a second embodiment of the invention a three stage binary counter as in the first embodiment of the invention is mechanized using capacitive coupling to couple the A.C. power signal to the three counter stages. The second embodiment of the invention is structurally similar to the first embodiment of the invention except that each of the power coils in the three cubical envelopes is replaced by a pair of capacitor plates which receive power radiated thereto. This second embodiment of the invention is particularly useful where the A.C. power signal has a relatively high frequency.

It should be noted that other embodiments of the invention can be mechanized wherein any one or all the input and output signal intercoupling can be accomplished by capacitor plates. Capacitive intercoupling of input and output signal would be particularly desirable where the input and output signals have primarily high frequency components.

In another embodiment of the invention, an electrical apparatus comprising a plurality of many electrical components is mechanized in accordance with the invention. The electrical units are in parallelpiped shaped envelopes which are stacked one on top of another as well as in horizontal rows.

It is therefore an object of the invention to provide an electrical apparatus comprising a plurality of reactively intercoupled electrical units.

It is another object of the invention to provide an electrical apparatus that is relatively easy to assemble and repair.

It is a further object of the invention to provide an electrical apparatus comprising electrical units that are partly inductively and partly capacitively intercoupled.

It is still another object of the invention to provide an electrical apparatus comprising inductively intercoupled electrical units, each contained in a corresponding envelope.

It is still a further object of the invention to provide a binary counter having a plurality of stages, each of the stages being positioned in a cubical envelope and being reactively intercoupled with each other and a source of an A.C. power signal and a source of an input signal.

It is still another object of the invention to provide an electrical apparatus comprising a plurality of envelopes stacked in a predetermined array, each envelope containing a corresponding electrical unit which is reactively intercoupled to adjacent units and to a source of A.C. power signal.

The novel features which are believed to be characteristic of the invention, both as to its organization and method of operation, together with further objects and advantages thereof, will be better understood from the following description considered in connection with the accompanying drawings in which severeal embodiments of the invention are illustrated by way of example. It is to be expressly understood, however, that the drawings are for the purpose of illustration and description only, and are not intended as a definition of the limits of the invention.

Figure 5A:
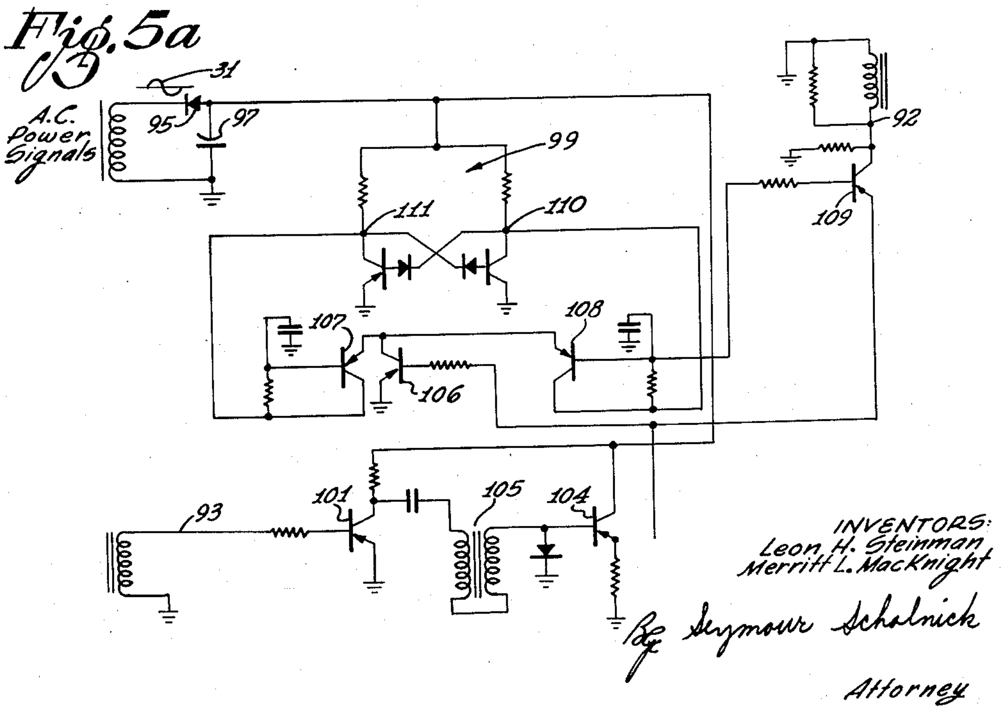

Figure 5*a* is a circuit diagram of a counter stage utilized in the first embodiment of the invention.

Figure 5B:
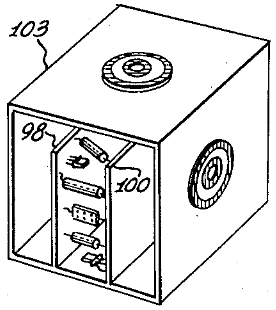

Figure 5*b* is an isometric view of a partially constructed envelope of the invention.

Figures 6A, 6B:
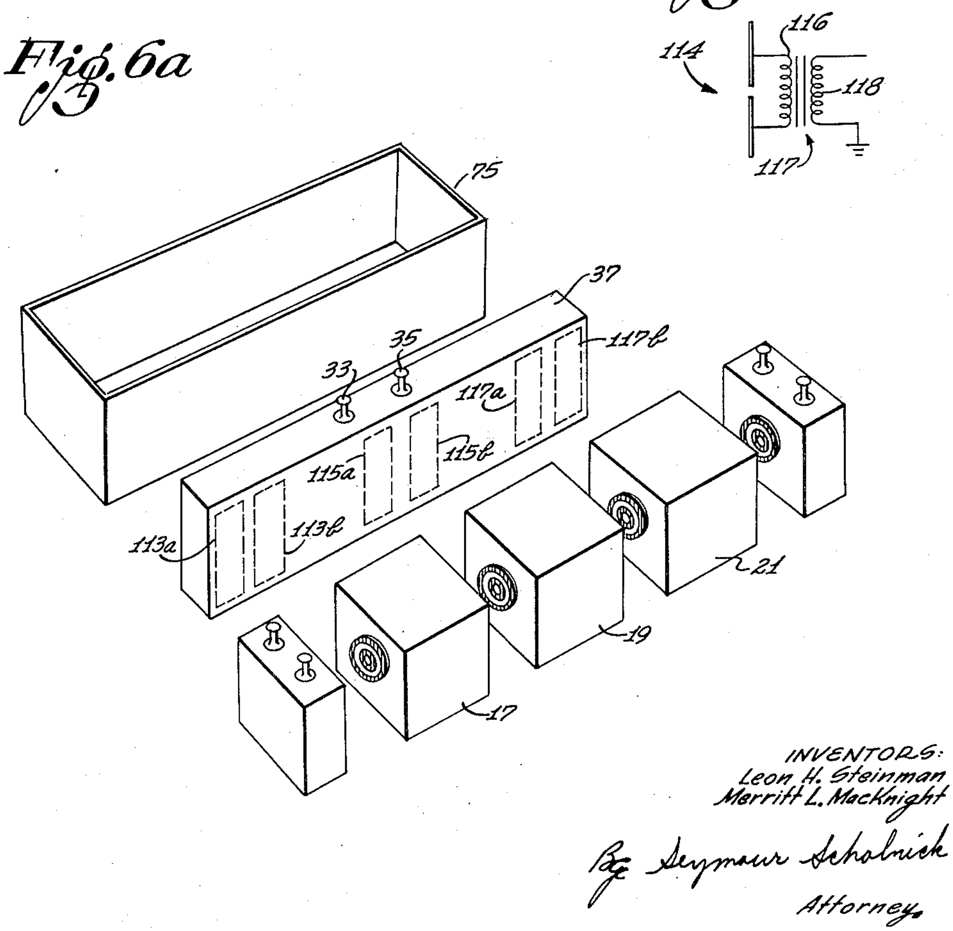

Figure 6*a* is an isometric view of the modified components utilized in the second embodiment of the invention.

Figure 6*b* is a diagram of an intercoupling circuit utilized in the second embodiment of the invention.

Figure 7:
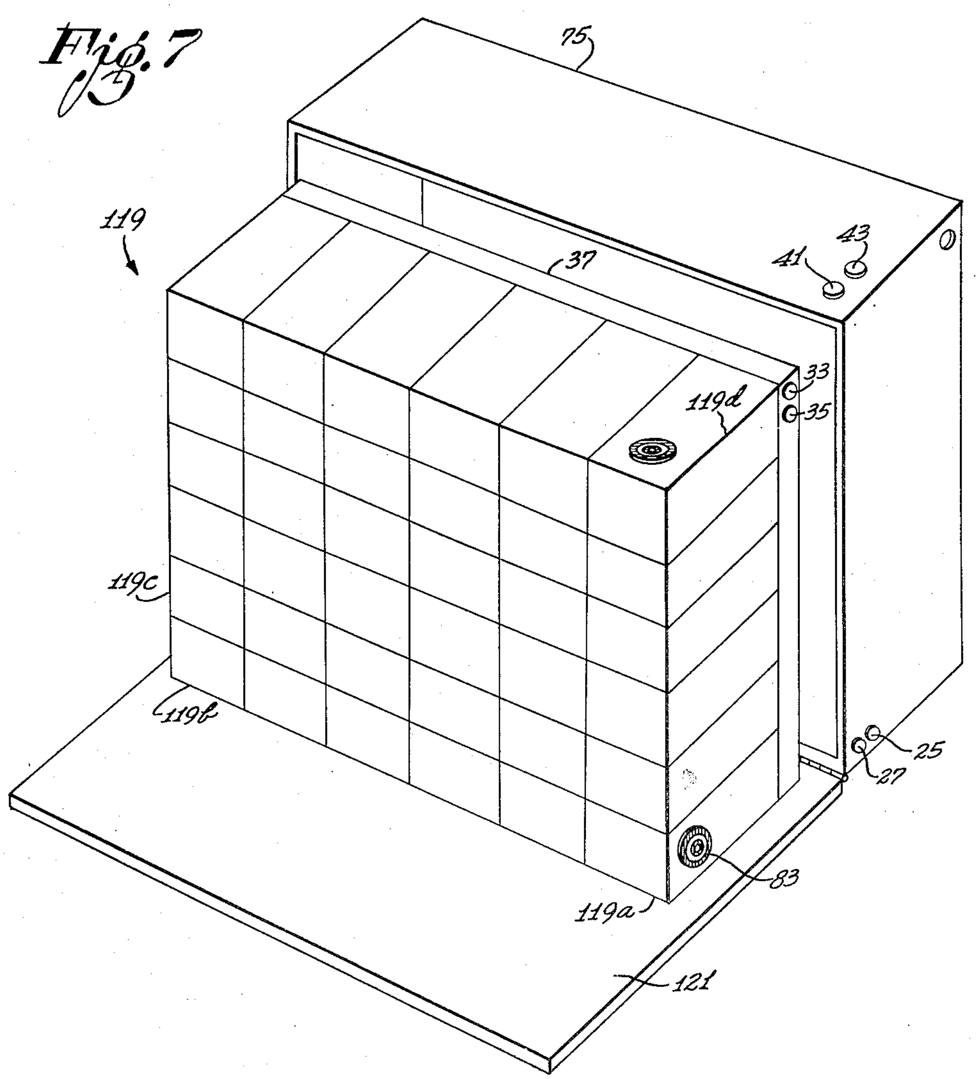

Figure 7 is an isometric diagram of another embodiment of the invention.

Figure 1:
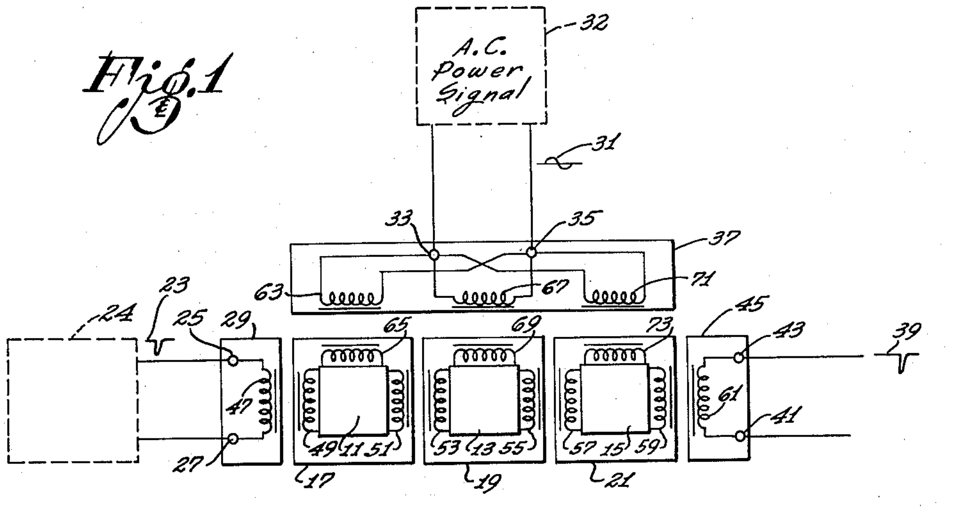
Figure 1 is a schematic top view of the first embodiment of the invention generally showing the intercoupling circuitry.

Referring now to the drawings, wherein like or corresponding parts are designated by the same reference characters throughout the several views, there is shown in Fig. 1 a schematic wiring and assembly diagram of a first embodiment of a binary counter constructed in accordance with the principles of the invention, wherein a series of three reactively intercoupled counter stages 11, 13, and 15 are positioned within a series of three cubical envelopes 17, 19, and 21, respectively. In this embodiment of the invention a series of negative pulse input signals 23 generated by a signal source 24 are applied to a pair of terminals 25 and 27 mounted on an input signal coupler 29 and an A.C. power signal 31 generated by a sine wave generator 32, is applied at a pair of terminals 33 and 35 mounted on a power radiation envelope 37 having a parallelpiped configuration to generate a series of negative pulse output signals 39 at a pair of terminals 41 and 43 mounted on an output signal coupler 45.

As will be hereinafter more fully discussed, counter stage 11 triggers on each input pulse and is responsive to every second input pulse 23 which it receives to generate a first stage output pulse. Counter stage 13 triggers on each first stage output pulse and is responsive to alternate output pulses received from counter stage 11 to generate a second stage negative output pulse. Counter stage 15 is similarly responsive to every second pulse received from stage 13 to generate output signal 39. As shown in Fig. 1, the three counter stages are intercoupled to each other, and to power radiation envelope 37 by means of a plurality of coils wound on corresponding ferromagnetic cores. Further, counter stage 11 is coupled to input signal coupler 29 and counter 15 is coupled to output signal coupler 45 in a similar manner.

Specifically, the input signals are coupled to counter stage 11 by means of coupling between an input coupling coil 47 (which is located in input signal coupler 29 and connected to terminals 25 and 27) and a coil 49 positioned in envelope 17 and connected to counter 11. The first stage output pulses produced by counter 11 are applied to counter 13 by means of coupling between an output coil 51 positioned in envelope 17 and a coil 53 which is connected to counter 13 and positioned in envelope 19. The second stage negative output pulses generated by counter 13 are applied to counter 15 by means of coupling between an output coil 55 positioned in envelope 19 and an input coil 57 connected to counter 15 and positioned in envelope 21. Output signals 39 generated by counter 15 are applied to terminals 41 and 43 of output signal coupler 45 by means of coupling between an output coil 59 (connected to counter 15 and positioned in envelope 21) and an output coupler coil 61 positioned in output signal coupler 45 and connected to terminals 41 and 43. A.C. power signal 31 is applied to counters 11, 13, and 15 by means of a series of three pairs of coils 63 and 65, 67 and 69, and 71 and 73, respectively. Coils 63, 67, and 71 are positioned in power radiation envelope 37 and connected in parallel to terminals 33 and 35. Coils 65, 69, and 73 are positioned in envelopes 17, 19, and 21, respectively, and are connected to counters 11, 13, and 15, respectively.

It should be herein clearly understood, of course, that for the intercoupling herein described to be effective coil pairs 47 and 49, 63 and 65, 51 and 53, 67 and 69, 55 and 57, 71 and 73, and 59 and 61 must be located in proximity to one another in such a manner that magnetic flux produced on any coil will interlink its paired coil. One technique whereby the coils can be so positioned and intercoupled with one another is utilized in a first embodiment of the invention.

Figure 2:
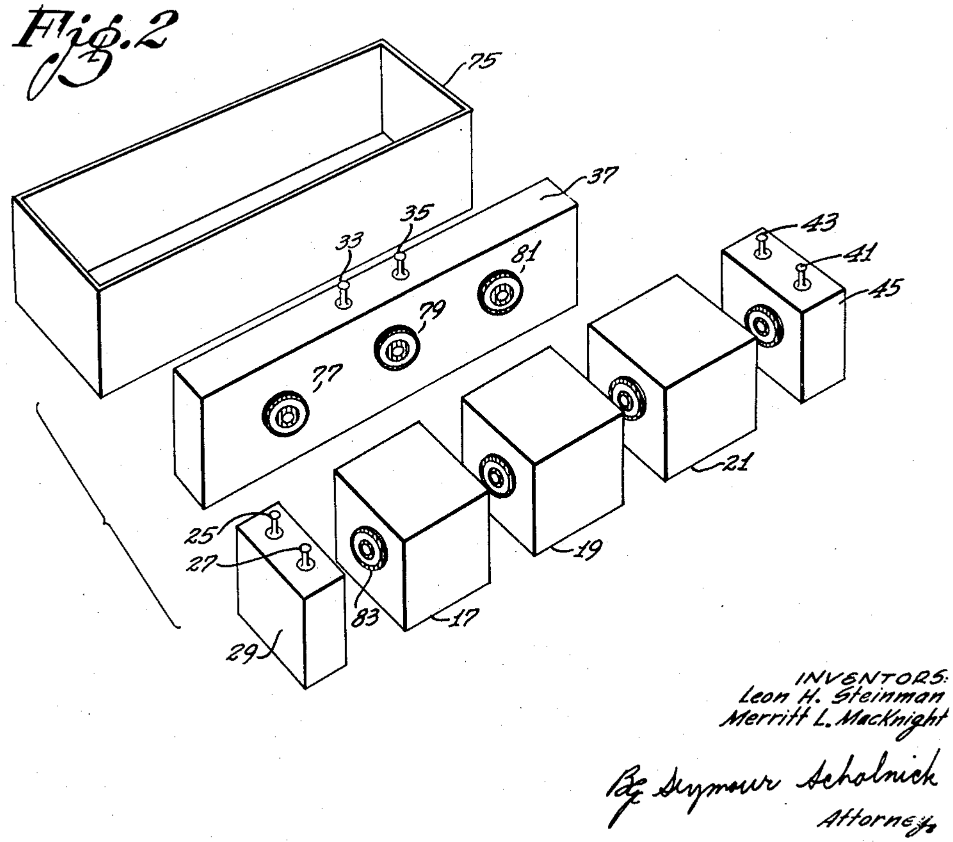
Figure 2 is an isometric view of the components of the first embodiment of the invention.

Referring now to Fig. 2 there is shown an isometric view, before assembly, of the components of the first embodiment of the invention shown in Fig. 1. In Fig. 2 the invention is shown before assembly since the method of inductive intercoupling can be more clearly depicted in this manner. In assembly input coupler 29, envelopes 17, 19, and 21 and output coupler 45 are placed in a row adjacent to power radiation envelope 37 (as shown in Fig. 2). To insure proper alignment of the components, they are assembled within an aligning frame or box 75.

As shown in Fig. 2, the side of power radiation envelope 37 that fits adjacent envelopes 17, 19, and 21 has a series of three cup cores 77, 79, and 81 mounted thereon. It should be noted that cup cores 77, 79 and 81 are so positioned on the side of the power radiation envelope that they will fit adjacent envelopes 17, 19 and 21, respectively, at predetermined points on the sides of the envelopes when the envelopes are assembled in the hereinbefore described manner. Envelopes 17, 19, and 21 each have a cup core mounted thereon (not visible in Fig. 2) which are so positioned as to abut cores 77, 79 and 81 respectively, when all envelopes are assembled. Coils 63, 67, and 71 are wound on cup cores 77, 79, and 81, respectively, and coils 65, 69 and 73 are wound on the corresponding cup cores located in envelopes 17, 19, and 21, respectively. Therefore, upon assembly of the envelopes coils 65 and 63, 69 and 67, and 71 and 73, respectively, will be positively placed in proximity with one another and magnetic flux originated by any of the coils will be directed through the abutting cup cores to interlink the corresponding paired coil.

Directing attention to the intercoupling of counter stage 11 within envelope 17 and input coupler 29, a cup core 83 shown in Fig. 2 and another cup core, not therein shown, are mounted on the adjacent sides of envelope 17 and input coupler 29 respectively, in such a manner that the cup cores are in registry with one another. Coil 47 is wound upon the cup core mounted on the side of input coupler 29 while coil 49 is wound on cup core 83. Therefore coils 47 and 49 are positively positioned in such a manner that the magnetic flux generated at coil 47 by the input signal will be directed through cup core 83 to coil 49 thereby applying the input signal to counter stage 11. In a manner so similar it need not be discussed further herein coils 51 and 53, 55 and 57, and 59 and 61, respectively, are positively positioned in proximity of one another by the cup cores upon which they are wound.

Figure 3:
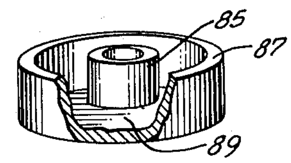
Figure 3 is an isometric drawing showing a ferrite cup core utilized in the practice of the invention.

Referring now to Fig. 3 there is shown a detailed isometric view of a conventional cup core which is utilized in the invention shown partially broken away, to more clearly disclose its configuration. As shown in Fig. 3, the cup core includes a pair of two concentric hollowed ferrite cylinders 85 and 87 spaced from each other by a predetermined distance and integrally joined at one end by a circular ferrite end plate 89. In operation when two cup cores are placed in proximity with one another the two cup cores provide a substantially closed magnetic path between coils wound on the separate cores, as is more clearly shown in Fig. 4.

Figure 4:
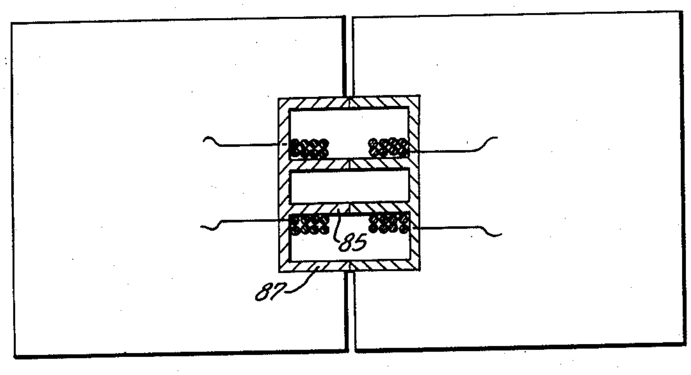
Figure 4 is a schematic cross-sectional side view of two intercoupled envelopes, according to the invention.

There is provided in Fig. 4 a schematic diagram showing a cross-sectional view of two intercoupled envelopes of the first embodiment of the invention depicting the nature of the alignment and positioning of the intercoupled coils and cup cores. As shown in Fig. 4, the coils are wound on cylinders 85 of the corresponding cup cores. The cup cores are preferably positioned in the envelopes so that they slightly extend therefrom, thereby insuring that cylinders 87 and 85 come in contact with each other. As shown in Fig. 4, this alignment provides substantially closed magnetic paths between the two coils.

It is clear in view of the foregoing description that the three counter stages of the first embodiment of the invention are completely interconnected without any physical interconnections between the envelopes. Counter envelopes may thereby be removed and replaced with little effort so that assembly of the binary counter is relatively easy. Further, repair of the binary counter can be conducted on a trial and error basis simply by replacing one envelope containing a counter stage thought to be defective by another envelope containing a counter stage known to be operative. In order to further simplify the repair of the binary counter of the invention each counter stage is identical so that only one type of spare part need be kept on hand.

To further clarify the operation of the described embodiment a detailed discussion of the specific circuitry of the counter stages will now be provided.

Referring now to Fig. 5*a* there is shown one circuit, suitable for use in any of counter stages 11, 13, and 15 of the invention, which is rendered operative by power signal 31 developed as hereinbefore described across an input power coil and which generates a negative pulse output on a conductor 92 in response to the application of two negative input pulses developed on an input conductor 93 by an input coil and cup core, as hereinbefore described.

As shown in Fig. 5*a*, A.C. power signal 31 is rectified and filtered by diode 95 and capacitor 97 to generate a negative power signal which is applied to a bistable flip-flop circuit, generally designated 99, and to a transistor 101 and a transistor 104.

Any negative input pulse received over conductor 93 is amplified and inverted by transistor 101 and inverted back to a negative pulse by transformer 105 and further amplified by a transistor 104. The amplified negative pulse then passes through a transistor 106 and is selectively applied to flip-flop 99 through either a gated transistor 107 or through a gated transistor 108 to thereby change the stable state of bistable flip-flop 99, thereby changing the level of a bilevel output signal which is generated by flip-flop 99 at a terminal 110. A corresponding complementary output signal is generated at a terminal 111.

The bilevel output signal appearing at terminal 110 is applied to the base of a transistor 109 which is utilized as a gated amplifier. The amplified negative pulse produced by transistor 104 is applied to the emitter of transistor 109. As shown in Fig. 5*a*, it is clear that gated amplifier transistor 109 will generate a negative pulse on output conductor 92 when the bilevel signal at its base has a low level concurrently with the application of the amplified negative pulse to the emitter of transistor 109. Since, as herein explained, the level of the bilevel signal changes with every application of the negative pulse on input conductor 93, one negative pulse is generated on output conductor 92 for every second negative pulses applied to conductor 93. A representative coil and cup core coupled to conductor 92 radiates the pulse to the next circuit.

Directing attention to the manner that the amplified negative pulse is selectively applied to the flip-flop, it is clear that transistor 107 will apply the amplified negative pulse to terminal 111 of flip-flop 99 only if the beforementioned complementary signal produced at terminal 111 is at its high level. It is equally clear that the application of the negative pulse at terminal 111 under these conditions will cause flip-flop 99 to change its state. In a similar manner transistor 108 will pass the applied negative pulse signal to terminal 110 only if the bilevel output signal at terminal 110 is at its high level and the presence of the negative pulse at terminal 110 under these conditions will similarly change the state of flip-flop 99.

In overall operation, therefore, it is clear that the circuit shown in Fig. 5*a* is suitable for use in any of counter stages 11, 13, and 15 since one negative pulse is generated by the circuit in response to every two applied negative pulses. The three stage binary counter, according to the invention, therefore, will generate negative output pulse signal 39 in response to every eight input pulse signals 23.

In connection with the assembly of the counter stages within the envelopes and with the composition and manner of construction of the envelopes, attention is directed to Fig. 5*b*, wherein there is shown one suitable method of constructing the envelopes.

In Fig. 5*b* there is shown a portion of a ¼" thick paper base phenolic tube 103 which is suitable for forming four of the six sides of any of the envelopes 17, 19, and 21. As indicated in Fig. 5*b*, the paper base phenolic tube, 1¼ inches in diameter is cut into portions 1¼ inches long. Further, a circle is drilled in the center of each of three sides of the tube, each hole having a diameter equal to or just a little larger than the diameter of the cup cores. As indicated in Fig. 5*b*, a cup core is cemented into each of the three holes so that the face of the cup core is parallel with the side to which it is cemented.

As shown in Fig. 5*b*, the electrical elements of the counter stage closed in the envelope are positioned between and coupled to a pair of two etched circuit boards 98 and 100 which are placed parallel to one another. Conductive strips etched on the circuit boards interconnect the electrical elements in a manner described in connection with Fig. 5*a* and further the coils wound on the cup cores are connected to the conductive strips at points determined as described in connection with Fig. 5*a*. As shown in Fig. 5*b*, the two etched circuit boards are supported by that face of the phenolic tubing which does not contain a cup core therein. The remaining two sides of the cubical envelope are formed by placing the phenolic tube, open end down, on a flat surface and filling the interior of the tube with an epoxy resin which may include the following substances: 100 parts of Shell Epon 828 Epoxy resin manufactured by the Shell Chemical Corporation; 30 parts Thiokol L.P–33 Polysuphide Rubber, manufactured by the Thiokol Chemical Corp. and 10 parts Diethylene Triamine, manufactured by the Carbide and Carbon Chemical Co. The solid interior of the envelope insures a stronger envelope and permanent positioning for the electrical elements of the electrical unit and for the cup cores.

A binary counter constructed according to the present invention has been found to operate satisfactorily over a wide range of frequencies and voltages of power signal 31 as well as over a range of voltages of input signal 23. With a power signal having a frequency of 200 kc. and a voltage of 14 volts R.M.S. and with an input signal having a magnitude of .4 volt, a 1 megacycle input rate was successfully counted down by the counter. Such a counter has performed well over wide ranges of alignment and spacing. Gaps of .016 inch or more between cup cores or misalignments of ⅛ inch could be tolerated without affecting the operation of the counter.

It is to be understood, of course, that the invention is not limited to inductive intercoupling but includes all types of reactive intercoupling as, for example, capacitive intercoupling. Further, it should be noted that in certain applications it is particularly useful to utilize a combination of inductive and capacitive intercoupling.

Referring now to Fig. 6*a* there is shown a view of a second embodiment of the invention (shown with its envelopes disassembled) which finds particular application with A.C. power signals of relatively high frequency, wherein a three stage binary counter structurally similar to the first embodiment of the invention is mechanized with partially inductive and partially capacitive intercoupling.

The input and output coupling of counter stages 11, 13, and 15 in envelopes 17, 19 and 21, respectively, are accomplished inductively by coils wound on cup cores in the same manner as with the first embodiment of the invention. However, power radiation envelope 37 is capactitatively intercoupled to envelopes 17, 19 and 21. As shown in Fig. 6*a*, a pair of capacitor plates 113*a* and 113*b* and a pair of capacitor plates, not shown therein, are mounted on the adjacent sides of power radiation envelope 37 and envelope 17, respectively, in such a manner that the two pairs of plates are in registry with one another. In a similar manner, a pair of plates 115*a* and 115*b* mounted on power radiation envelope 37 are positioned so that they are in registry with a pair of capacitor plates mounted on envelope 19. Further, a pair of capacitor plates 117*a* and 117*b* mounted on power radiation envelope 37 are positioned in registry with a pair of capacitor plates mounted on envelope 21. All of the capacitor plates herein mentioned are preferably recessively mounted on the sides of the respective envelopes to which they are attached so that the plates are separated by a layer of air which acts as a dielectric material or by a thin sheet of some other preferred dielectric material. Capacitor plates 113*a*, 115*a* and 117*a* are connected to terminal 33 while capacitor plates 113*b*, 115*b* and 117*b* are connected to terminal 35.

There is shown in Fig. 6*b* a pair of capacitor plates 114 which are representative of the pair of capacitor plates mounted on each of envelopes 17, 19 and 21. As shown in Fig. 6*b*, the two capacitor plates are intercoupled by means of a primary winding 116 of a transformer 117. A secondary winding 118 of transformer 117 is connected at one end to a source of ground potential and at the other end to diode 95 of the counter circuit shown in Fig. 5*a*.

In operation the A.C. power signal is applied from terminals 33 and 35 which are mounted on power radiation envelope 37 to the pairs of capacitor plates 113, 115 and 117, each of which generate a radiated power signal. Each of the radiated power signals is received by one of the pairs of capacitor plates mounted on the envelopes and results in a potential difference being applied across primary coil 116 which in turn induces a voltage potential across secondary winding 118, thereby providing an A.C. power signal to each of the counter stages.

There is shown in Fig. 7 another embodiment of the invention wherein a counter comprising a plurality of inductively intercoupled counter stages is responsive to the application of input signal 23 to terminals 25 and 27 and power signal 31 to terminals 33 and 35 to generate output signal 39 at terminals 41 and 43. As shown in Fig. 7, each counter stage is contained within a parallelepiped shaped envelope 119. Further, the envelopes containing the counter stages are stacked one on top of the other as well as side by side while power radiation envelope 37 is positioned adjacent the stacked envelopes so that one side of each of the envelopes containing the counter stages is adjacent a predetermined side of power radiation envelope 37. The assembled power radiation envelope and envelopes 119 are placed in a frame 75 having a door 121 which when closed insures the proper assembly of the envelopes with the power radiation envelope.

The power signal applied to terminals 33 and 35 by a conductor passing through an aperture in frame 75 is applied to the counter stages within envelopes 119 by a plurality of coils wound on a plurality of cup cores mounted on the predetermined side of power radiator envelope 37. The structure and operation of this type of intercoupling is thoroughly described in connection with the discussion of the first embodiment of the invention and therefore a further discussion herein is unwarranted. As shown in Fig. 7, the input signal is applied to terminals 25 and 27 which are connected to an input coupling coil, not shown. The input coupling coil is wound on a cup core which is mounted on frame 75 in such a manner that when the invention is assembled the cup core is in registry with cup core 83 mounted on the side of envelope 119*a*, whereby the input signal is applied to the counter stage within envelope 119*a*. In the manner hereinbefore described in connection with the discussion in the first embodiment of the invention the counter stages within the envelopes to the left of envelope 119*a*, as shown in Fig. 7, are successively intercoupled while envelope 119*b* is intercoupled to envelope 119*c* which is positioned directly above envelope 119*b*. The envelopes to the right of envelope 119*c* are then successively intercoupled. The remaining envelopes are intercoupled in the manner herein discussed so that the counters are intercoupled in a snake-like manner with the output counter 119*d* being the last counter stage to be successively intercoupled.

Therefore, the counter shown in Fig. 7 is equivalent to a counter mechanized with 36 envelopes placed side by side as in the first embodiment of the invention. The output signal from envelope 119*d* is inductively coupled to terminals 41 and 43 in the same manner as described in the first embodiment of the invention except that the cup core and the output coupling coil wound thereon are mounted on frame 75 in such a manner that the cup core is in registry with the output cup core mounted on envelope 119*d*.

This embodiment of the invention is particularly useful where the counter comprises a relatively large number of counter stages. It should be clear, of course, even though only one stack of envelopes 19 are shown in Fig. 7, that more than one stack of envelopes can be placed adjacent to one another.

It is to be expressly understood, of course, that numerous other modifications and alterations may be made in the reactively intercoupled electrical units of the invention. For example, the envelopes do not have to completely contain or enclose the electrical units therein nor do the envelopes have to be covered. All that is necessary is that the envelopes have a configuration such that they can be stacked and aligned in accordance with the teachings of the invention. Accordingly, it is to be expressly understood that the scope of the invention is to be limited only by the spirit and scope of the appended claims.

What is claimed as new is:

1. An electrical apparatus responsive to an applied power signal for operating on an applied input signal in a predetermined manner to generate a corresponding output signal, said apparatus comprising: an envelope; an electrical unit positioned in said envelope and operable in response to application of the power signal and the input signal for operating on the input signal in the predetermined manner to generate the output signal; first reactive coupling means including a first and a second separable component, said first separable component being coupled to the source of the power signal and positioned outside said envelope and said second separable component being positioned in said envelope and connected to said electrical unit, said first reactive coupling means being operable when said first and second separable components are in proximity to each other for applying the power signal to said electrical unit; and mechanical means for mechanically positioning said first separable component and said envelope so that said first and second separable components are in proximity to each other.

2. The combination defined in claim 1 which further includes second reactive coupling means having third and fourth separable components, said third separable component being coupled to said electrical unit and positioned within said envelope and said fourth separable component being positioned outside said envelope and having said input signal applied thereto, said second reactive coupling means being operable for applying the input signal to said electrical unit when said third and fourth separable components are in proximity of each other; third reactive coupling means having fifth and sixth separable components, said fifth separable component being positioned in said envelope and coupled to said electrical unit and said sixth separable component being positioned outside said envelope, said third reactive coupling means being operable for transferring the output signal to said sixth separable component when said fifth and sixth separable components are in proximity with each other; and wherein said mechanical means further includes apparatus for positioning said envelope, said fourth separable component, and said sixth separable component so that said third and fourth separable components, and said fifth and sixth separable components are in proximity with each other, respectively.

3. In an electrical apparatus, the combination comprising: a source of a power signal; an envelope; an active electrical unit positioned in said envelope and energizable in response to the application of the power signal for operating on an applied input signal in a predetermined manner to generate an output signal; first inductive coupling means including a first and a second coil, said first coil being positioned outside said envelope and coupled to said source of said power signal and said second coil being positioned in said envelope and coupled to said electrical unit, said first inductive coupling means being operable for applying said power signal to said active electrical unit when said first and second coils are in proximity of each other; input coupling means for applying the input signal to said active electrical unit; and positioning means for mechanically positioning said envelope relative to said first coil so that said first and said second coils are in proximity of each other.

4. The combination defined by claim 3 wherein said first inductive coupling means further includes first and second magnetic cores, said first and second coils being wound on said first and second magnetic cores, respectively.

5. The combination defined by claim 4 wherein said positioning means further includes apparatus for aligning said first and second cores.

6. The combination defined in claim 3 wherein said input coupling means further includes a third coil coupled to said electrical unit and positioned in said envelope and a fourth coil positioned exterior of said envelope, said input coupling means being responsive to the application of the input signal to said fourth coil for applying the input signal to said electrical unit when said third and fourth coils are in proximity of one another; said combination further including second inductive coupling means including a fifth coil coupled to said electrical unit and positioned in said envelope and a sixth coil coupled to said electrical unit and positioned exterior to said envelope, said second inductive coupling means being operable to generate the output signal across said sixth coil when said fifth and sixth coils are in proximity with one another; and said positioning means further includes apparatus for positioning said envelope, said fourth coil and sixth coil so that said third and fourth coils and said fifth and sixth coils are in proximity with each other, respectively.

7. The combination defined in claim 6 wherein said first, second, third, fourth, fifth and sixth coils are wound on corresponding first, second, third, fourth, fifth and sixth cup cores, said third and fifth cores being positioned in said envelope.

8. The combination defined in claim 7 wherein said positioning means includes apparatus for positioning said envelope and said fourth and sixth coils so that the corresponding cores of said third and fourth coils form a substantially closed magnetic core between said third and fourth coils and so that the corresponding cup cores of said fifth and sixth coils form a substantially closed magnetic path between said fifth and sixth coils.

9. An electrical apparatus adaptable for operating on an input signal in a predetermined manner for generating a corresponding output signal upon application of a power signal from a power signal source, said apparatus comprising: an electrical unit operable in response to the application of the power signal and the input signal for operating on the input signal in a predetermined manner to generate the output signal; an envelope enclosing said electrical unit; first capacitive coupling means including first and second capacitor plates, said first capacitor plate being positioned outside said envelope and being coupled to the source of the power signal and said second capacitor plate being positioned in said envelope and coupled to said electrical unit, said capacitive coupling means being operable for applying the power signal to said active electrical unit when said first and second capacitive plates are in proximity with one another; input coupling means for applying the input signal to said electrical unit; and mechanical means for mechanically positioning said first capacitive plate and said envelope so that said first and second capacitive plates are in proximity with each other.

10. An electrical apparatus coupled to a source of an A.C. power signal and composed of a plurality of intercoupled circuits, said apparatus being adapted for operating on an input signal in a predetermined manner for generating an output signal, said apparatus comprising: first and second coils each of said coils being wound on a corresponding magnetic core and being coupled to the source of the power signal; a third coil wound on a corresponding magnetic core; first coupling means for applying the input signal to said third coil; a first electrical circuit including fourth, fifth, and sixth coils, each wound on a corresponding magnetic core; a first envelope containing said first electrical circuit; a second electrical circuit including seventh, eighth and ninth coils, each coil wound on a corresponding magnetic coil; a second envelope containing said second electrical circuit; means for mechanically positioning said first and second envelopes and said first, second and third coils to align said first and fourth, second and seventh, fifth and eighth and sixth and third coils, respectively, so that the cores of the aligned coils butt together whereby said first and second envelopes receive the power signal, said first envelope receives the input signal and said first and second envelopes are intercoupled into a circuit characteristic of the electronic apparatus, said second electrical circuit thereby radiating the output signal.

11. An electrical apparatus, said apparatus comprising: an envelope having first and second parallel sides; a source of an input signal; an electrical unit positioned in said envelope and responsive to the application of said input signal for generating an output signal; first reactive coupling means including first and second separable components for applying said input signal to said electrical unit when said first and second separable components are in proximity to each other, said first separable component being positioned in said envelope and coupled to said electrical unit and said second separable component being positioned outside said envelope and being coupled to said source of said input signal; second reactive coupling means including third and fourth separable components for regenerating said output signal at said fourth separable component when said third and fourth separable components are in proximity to one another, said third separable component being positioned in said envelope and coupled to said electrical unit and said fourth separable component being positioned outside said envelope; and positioning means for positioning said second separable component, said fourth separable component and said envelope so that said first and second separable components and said third and fourth separable components are in proximity of one another, respectively.

12. The combination defined in claim 11 which further includes a source of a power signal and third reactive coupling means having fifth and sixth separable components for applying said power signal to said electrical unit when said fifth and sixth separable components are in proximity of each other, said fifth separable component being positioned in said envelope and coupled to said electrical unit and said sixth separable component being positioned outside said envelope and being coupled to said source of said power signal, and said positioning means further includes apparatus for positioning said fifth and sixth separable components in proximity with one another.

13. An electrical apparatus coupled to a source of a power signal and adapted for operating on an input signal in a predetermined manner for generating an output signal, said apparatus comprising: a first electrical unit responsive to the application of the power signal and the input signal to generate an internal signal; a first envelope containing said first electrical unit; a second electrical unit responsive to the application of the power signal and said internal signal to generate the output signal; a second envelope containing said second electrical unit; first reactive coupling means having first, second, third and fourth separable components for applying said power signal to said first and second electrical units when said first and second separable components and said third and fourth separable components are in proximity with one another, respectively, said first and third separable components being coupled to the source of the power signal and positioned outside said envelopes and said second and fourth separable components being coupled to said first and second electrical units, respectively, and positioned in said first and second envelopes, respectively; second reactive coupling means having fifth and sixth separable components for applying said internal signal to said second electrical unit when said fifth and sixth separable components are in proximity with one another, said fifth separable component being coupled to said first electrical unit and positioned in said first envelope and said sixth separable component being coupled to said second electrical unit and positioned in said second envelope; third reactive coupling means having seventh and eighth separable components and being operable for applying the input signal to said first electrical unit when said seventh and and eighth separable components are in proximity with one another and the input signal is applied to said seventh separable component, said eighth separable component being coupled to said first electrical unit and positioned in said first envelope and said seventh separable component being positioned outside said first envelope; fourth reactive coupling means having ninth and tenth separable components and being operable to regenerate the output signal at said tenth separable component when said ninth and tenth separable components are in proximity with one another, said ninth separable component being coupled to said second electrical unit and positioned in said second envelope and said tenth separable component being positioned outside said second envelope;

and mechanical means for positioning said first envelope, second envelope, and said first, third, seventh and tenth components so that said first and second separable components, third and fourth separable components, fifth and sixth separable components, seventh and eighth separable components, ninth and tenth separable components are in proximity with one another, respectively.

References Cited in the file of this patent

UNITED STATES PATENTS

| | | |
|---|---|---|
| 1,501,649 | Cummings | July 15, 1924 |
| 1,612,952 | Stevenson | Jan. 4, 1927 |
| 2,133,494 | Waters | Oct. 18, 1938 |
| 2,379,800 | Hare | July 3, 1945 |
| 2,415,688 | Hall | Feb. 11, 1947 |
| 2,474,988 | Sargrove | July 5, 1949 |
| 2,783,416 | Butler | Feb. 26, 1957 |

OTHER REFERENCES

Radio Craft, pages 400, 401 and 431, January 1939.

Notice of Adverse Decision in Interference

In Interference No. 92,239 involving Patent No. 2,967,267, L. H. Steinman and M. L. MacKnight, REACTIVE INTERCOUPLING OF MODULAR UNITS, final judgment adverse to the patentees was rendered June 13, 1962, as to claim 11.

[*Official Gazette March 30, 1965.*]